US010838062B2

(12) United States Patent
de Mersseman et al.

(10) Patent No.: US 10,838,062 B2
(45) Date of Patent: Nov. 17, 2020

(54) DIRECT DETECTION LIDAR SYSTEM AND METHOD WITH PULSE AMPLITUDE MODULATION (AM) TRANSMITTER AND QUADRATURE RECEIVER

(71) Applicant: Veoneer US, Inc., Southfield, MI (US)

(72) Inventors: Bernard de Mersseman, Andover, MA (US); Kenneth V. Puglia, Westford, MA (US)

(73) Assignee: Veoneer US, Inc., Southfield, MI (US)

( * ) Notice: Subject to any disclaimer, the term of this patent is extended or adjusted under 35 U.S.C. 154(b) by 273 days.

(21) Appl. No.: 15/226,435

(22) Filed: Aug. 2, 2016

(65) Prior Publication Data
US 2017/0343671 A1  Nov. 30, 2017

Related U.S. Application Data

(60) Provisional application No. 62/340,758, filed on May 24, 2016.

(51) Int. Cl.
*G01S 17/00* (2020.01)
*G01S 17/26* (2020.01)
(Continued)

(52) U.S. Cl.
CPC .............. *G01S 17/26* (2020.01); *G01S 7/484* (2013.01); *G01S 7/486* (2013.01); *G01S 17/10* (2013.01); *G01S 17/58* (2013.01); *G01S 17/931* (2020.01)

(58) Field of Classification Search
CPC .......... G01S 7/484; G01S 7/486; G01S 17/10; G01S 17/58; G01S 17/102; G01S 17/936
(Continued)

(56) References Cited

U.S. PATENT DOCUMENTS 3,712,985 A * 1/1973 Swarner et al. ........ G01S 17/02
250/216
4,125,864 A 11/1978 Aughton
(Continued)

FOREIGN PATENT DOCUMENTS

| AT | 509180 B1 | 1/2016 |
|---|---|---|
| DE | 19757840 C1 | 9/1999 |

(Continued)

OTHER PUBLICATIONS

International Search Report and Written Opinion in corresponding PCT Application No. PCT/US2017/033263, International Filing Date May 18, 2017; dated Aug. 29, 2017.
(Continued)

*Primary Examiner* — James R Hulka
(74) *Attorney, Agent, or Firm* — Burns & Levinson LLP; Steven M. Mills (57) ABSTRACT

A LiDAR system and method includes a pulse modulation circuit and an amplitude modulation circuit for applying pulse modulation and amplitude modulation to a continuous signal to generate a plurality of amplitude-modulated pulses of the continuous signal. An optical modulation circuit applies the amplitude-modulated pulses of the continuous signal to an optical signal to generate a pulse amplitude-modulated (PAM) optical signal. Optical transmission elements transmit the PAM optical signal into a region, and optical receiving elements receive reflected optical signals from the region. Receive signal processing circuitry uses quadrature detection to process the reflected optical signals.

14 Claims, 4 Drawing Sheets

(51) Int. Cl.
*G01S 17/10* (2020.01)
*G01S 17/58* (2006.01)
*G01S 7/486* (2020.01)
*G01S 17/931* (2020.01)
*G01S 7/484* (2006.01)

(58) Field of Classification Search
USPC ........................................................ 356/5.01
See application file for complete search history.

(56) References Cited

U.S. PATENT DOCUMENTS

| | | |
|---|---|---|
| 4,184,154 A | 1/1980 | Albanese et al. |
| 4,362,361 A | 12/1982 | Campbell et al. |
| 4,439,766 A | 3/1984 | Kobayashi et al. |
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A * | 12/1993 | Carbonneau ....... H04B 10/2587 342/20 |
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A * | 10/1999 | Gerber ................. F41G 3/2655 342/45 |
| 6,437,854 B2 * | 8/2002 | Hahlweg ................ G01S 17/95 356/5.09 |
| 6,556,282 B2 * | 4/2003 | Jamieson ............. G01C 23/005 356/141.1 |
| 6,559,932 B1 | 5/2003 | Halmos |
| 7,202,941 B2 * | 4/2007 | Munro .................... G01S 7/483 356/4.1 |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 * | 2/2009 | Varshneya .............. G01S 7/481 398/33 |
| 7,544,945 B2 * | 6/2009 | Tan ....................... G01S 7/4811 250/341.1 |
| 7,570,347 B2 * | 8/2009 | Ruff ....................... G01S 17/34 356/5.01 |
| 7,675,610 B2 * | 3/2010 | Redman ................. G01S 7/486 356/5.03 |
| 7,832,762 B2 * | 11/2010 | Breed .................... B60R 21/013 280/735 |
| 8,044,999 B2 * | 10/2011 | Mullen ................. G01S 7/4912 348/67 |
| 8,050,863 B2 | 11/2011 | Trepagnier et al. |
| 8,134,637 B2 * | 3/2012 | Rossbach .............. G01S 17/894 348/348 |
| 8,223,215 B2 * | 7/2012 | Oggier ................. G01S 17/894 348/222.1 |
| 8,363,511 B2 * | 1/2013 | Frank .................... G01S 15/104 367/101 |
| 8,508,723 B2 * | 8/2013 | Chang .................. G01S 17/87 356/28 |
| 85,088,723 * | 8/2013 | Chang et al. ............. G01P 3/36 356/28 |
| 8,629,975 B1 | 1/2014 | Dierking et al. |
| 8,742,325 B1 | 6/2014 | Droz et al. |
| 8,836,761 B2 * | 9/2014 | Wang ................... G01S 7/4817 348/46 |
| 8,836,922 B1 | 9/2014 | Pennecot |
| 8,879,050 B2 * | 11/2014 | Ko ........................ G01S 17/89 356/5.01 |
| 9,007,569 B2 * | 4/2015 | Amzajerdian .......... G01S 17/58 356/28 |
| 9,063,549 B1 | 6/2015 | Pennecot et al. |
| 9,086,273 B1 | 7/2015 | Gruver et al. |
| 9,090,213 B2 | 7/2015 | Lawlor et al. |
| 9,097,646 B1 | 8/2015 | Campbell et al. |
| 9,140,792 B2 * | 9/2015 | Zeng ....................... G01S 17/42 |
| 9,157,790 B2 * | 10/2015 | Shpunt ............... G02B 27/0961 |
| 9,267,787 B2 | 2/2016 | Shpunt et al. |
| 9,285,477 B1 | 3/2016 | Smith et al. |
| 9,575,162 B2 | 2/2017 | Owechko |
| 9,618,742 B1 | 4/2017 | Droz et al. |
| 9,651,417 B2 * | 5/2017 | Shpunt ............... G02B 27/0961 |
| 9,658,322 B2 * | 5/2017 | Lewis .................. G01S 7/4813 |
| 9,696,427 B2 * | 7/2017 | Wilson .................... G01S 17/89 |
| 9,711,493 B2 * | 7/2017 | Lin ........................ H01L 25/167 |
| 9,753,351 B2 | 9/2017 | Eldada |
| 9,823,351 B2 * | 11/2017 | Haslim ................. G01S 7/4818 |
| 9,857,472 B2 * | 1/2018 | Mheen .................... G01S 17/87 |
| 9,869,754 B1 | 1/2018 | Campbell et al. |
| 10,018,725 B2 * | 7/2018 | Liu ......................... G01S 7/499 |
| 10,018,726 B2 * | 7/2018 | Hall ....................... G01S 17/10 |
| 10,024,655 B2 * | 7/2018 | Raguin .................. A61B 5/117 |
| 10,078,133 B2 * | 9/2018 | Dussan ................ G01S 17/931 |
| 10,175,360 B2 * | 1/2019 | Zweigle ................ G01S 17/42 |
| 10,183,541 B2 * | 1/2019 | Van Den Bossche ........................ B60G 17/0165 |
| 10,411,524 B2 * | 9/2019 | Widmer ................. B60L 53/126 |
| 10,416,292 B2 * | 9/2019 | de Mersseman ....... G01S 7/484 |
| 10,473,767 B2 | 11/2019 | Xiang et al. |
| 10,473,784 B2 * | 11/2019 | Puglia .................... G01S 17/931 |
| 10,473,943 B1 | 11/2019 | Hughes |
| 10,557,923 B2 * | 2/2020 | Watnik .................. G01S 7/4815 |
| 10,558,044 B2 * | 2/2020 | Pan ..................... G02B 27/0172 |
| 10,564,268 B2 * | 2/2020 | Turbide ................. G01S 7/486 |
| 10,578,724 B2 * | 3/2020 | Droz ....................... G01S 17/42 |
| 10,678,117 B2 * | 6/2020 | Shin ........................ G02F 1/292 |
| 2001/0052872 A1 | 12/2001 | Hahlweg |
| 2003/0043363 A1 | 3/2003 | Jamieson |
| 2004/0028418 A1 * | 2/2004 | Kaplan .................... H04J 14/08 398/188 |
| 2004/0031906 A1 | 2/2004 | Glecker |
| 2004/0135992 A1 | 7/2004 | Munro |
| 2006/0221250 A1 | 10/2006 | Rossbach et al. |
| 2006/0232052 A1 | 10/2006 | Breed |
| 2007/0140613 A1 * | 6/2007 | Achiam ............... G02B 6/4225 385/14 |
| 2007/0181810 A1 | 8/2007 | Tan et al. |
| 2007/0219720 A1 * | 9/2007 | Trepagnier ........... G05D 1/0278 701/300 |
| 2008/0088499 A1 * | 4/2008 | Bonthron et al. ....... G01S 13/02 342/104 |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 * | 1/2009 | Varshneya .............. G01S 7/481 398/33 |
| 2009/0190007 A1 * | 7/2009 | Oggier .................... G01S 17/89 348/241 |
| 2010/0157280 A1 | 6/2010 | Kusevic et al. |
| 2010/0182874 A1 * | 7/2010 | Frank et al. ............ G01S 15/10 367/101 |
| 2012/0075422 A1 | 3/2012 | Wang et al. |
| 2012/0206712 A1 * | 8/2012 | Chang .................... G01S 17/58 356/28 |
| 2012/0236379 A1 | 9/2012 | da Silva et al. |
| 2012/0310516 A1 | 12/2012 | Zeng |
| 2012/0310519 A1 * | 12/2012 | Lawlor .................... B60R 1/12 701/301 |
| 2013/0093584 A1 | 4/2013 | Schumacher |
| 2013/0120760 A1 | 5/2013 | Raguin et al. |
| 2013/0206967 A1 | 8/2013 | Shpunt et al. |
| 2013/0207970 A1 | 8/2013 | Shpunt et al. |
| 2013/0250276 A1 * | 9/2013 | Chang .................... G01S 17/58 356/28.5 |
| 2014/0036252 A1 | 2/2014 | Amzajerdian et al. |
| 2014/0049609 A1 | 2/2014 | Wilson |
| 2014/0152975 A1 | 6/2014 | Ko |
| 2014/0168631 A1 | 6/2014 | Haslim |
| 2014/0313519 A1 * | 10/2014 | Shpunt .................. G01S 7/4815 356/612 |
| 2015/0009485 A1 | 1/2015 | Mheen |
| 2015/0260843 A1 | 9/2015 | Lewis |

(56) References Cited

U.S. PATENT DOCUMENTS

| | | | |
|---|---|---|---|
| 2015/0301162 A1* | 10/2015 | Kim | G01S 7/4868 356/5.03 |
| 2015/0371074 A1 | 12/2015 | Lin | |
| 2015/0378011 A1 | 12/2015 | Owechko | |
| 2016/0047895 A1 | 2/2016 | Dussan | |
| 2016/0178749 A1 | 6/2016 | Lin et al. | |
| 2016/0200161 A1 | 7/2016 | Van Den Bossche et al. | |
| 2016/0245902 A1 | 8/2016 | Watnik et al. | |
| 2016/0291160 A1* | 10/2016 | Zweigle et al. | G01S 17/89 |
| 2016/0357187 A1 | 12/2016 | Ansari | |
| 2016/0363669 A1 | 12/2016 | Liu | |
| 2016/0380488 A1* | 12/2016 | Widmer | H04B 5/0037 324/207.15 |
| 2017/0090013 A1 | 3/2017 | Paradie et al. | |
| 2017/0269215 A1 | 9/2017 | Hall et al. | |
| 2017/0285346 A1 | 10/2017 | Pan | |
| 2017/0307736 A1 | 10/2017 | Donovan | |
| 2018/0052378 A1 | 2/2018 | Shin et al. | |
| 2018/0241477 A1* | 8/2018 | Turbide et al. | H04B 10/61 |
| 2018/0341009 A1 | 11/2018 | Niclass et al. | |
| 2018/0364334 A1 | 12/2018 | Xiang et al. | |
| 2018/0372870 A1* | 12/2018 | Puglia | G01S 17/58 |
| 2019/0146060 A1 | 5/2019 | Qiu et al. | |
| 2019/0235064 A1 | 8/2019 | Droz et al. | |
| 2020/0081129 A1* | 3/2020 | de Mersseman | G01S 7/4811 |
| 2020/0088847 A1* | 3/2020 | DeMersseman | G02B 7/1821 |

FOREIGN PATENT DOCUMENTS

| | | | |
|---|---|---|---|
| DE | 102004033944 A1 | 2/2006 | |
| DE | 102006031114 A1 | 1/2008 | |
| DE | 102015217908 A1 | 3/2017 | |
| EP | 0112188 A2 | 6/1984 | |
| EP | 0578129 A2 | 1/1994 | |
| EP | 2696166 A2 | 2/2014 | |
| EP | 2824418 A1 | 1/2015 | |
| EP | 3147685 A1 | 3/2017 | |
| EP | 3203259 A1 | 8/2017 | |
| WO | 1994019705 A1 | 9/1994 | |
| WO | 2008/008970 A2 | 1/2008 | |
| WO | 2015/014556 A2 | 2/2015 | |
| WO | 2016/097409 A2 | 6/2016 | |
| WO | 2019050643 A1 | 3/2019 | |

OTHER PUBLICATIONS

Invitation to Pay Additional Fees dated Mar. 8, 2019 in PCT/US2018/052849.
International Search Report and Written Opinion in corresponding International Application No. PCT/US2018/057727, dated Jan. 28, 2019; 12 pages.
International Search Report and Written Opinion in corresponding International Application No. PCT/US2018/052837, dated Jan. 24, 2019; 13 pages.
Skolnik, M.I., Introduction to Radar Systems, 3rd Edition, pp. 45-48, McGraw-Hill, New York, NY 2001; 6 pages.
Range-Doppler image processing in linear FMCW Radar and FPGA Based Real-Time Implementation, Journal of Communication and Computer, vol. 6, No. 4, Apr. 2009.
International Search Report and Written Opinion in corresponding International Application No. PCT/US2018/048869, dated Nov. 8, 2018; 14 pages.
International Search Report and Written Opinion in corresponding International Application No. PCT/US2018/051281, dated Nov. 22, 2018; 14 pages.
Kasturi et al., UAV-Borne LiDAR with MEMS Mirror Based Scanning Capability; SPIE Defense and Commercial Sensing Conference 2016; Apr. 20, 2016; Baltimore, MD; 10 pages.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airbome-Laser-Scanning-in-a-Kinematical-Framework.pdf.
Internet URL: http://www.advancedscientificconcepts.com/products/overview.html [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.
Hewlett-Packard Application Note 77-4, Swept-Frequency Group Delay Measurements, Hewlett-Packard Co., Sep. 1968, 7 pages.
Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.
Journet et al., A Low-Cost Laser Range Finder Based on an FMCW-like Method, IEEE Transactions on Instrumentation and Measurement, Aug. 2000, vol. 49, No. 4, pp. 840-843.
Campbell et al., Advanced Sine Wave Modulation of Continuous Wave Laser System for Atmospheric CO2 Differential Absorption Measurements; NASA Langley Research Center; 32 pages [retrieved on Dec. 20, 2018].
Levanon et al., Non-coherent Pulse Compression—Aperiodic and Periodic Waveforms; The Institution of Engineering and Technology, 2015; 9 pages.
Peer et al., Compression Waveforms for Non-Coherent Radar, Tel Aviv University; 6 pages [retrieved on Dec. 20, 2018].
Li, Larry, Time-of-Flight Camera—An Introduction, Technical White Paper, SLOA190B, Texas Instruments; Jan. 2014; 10 pages.
Pierrottet et al., Linear FMCW Laser Radar for Precision Range and Vector Velocity Measurements, Coherent Applications, Inc.; NASA Langley Research Center; 9 pages [retrieved on Dec. 20, 2018].
Kahn, Joseph M., Modulation and Detection Techniques for Optical Communication Systems, Stanford University, Department of Electrical Engineering, 2006; 3 pages.
Niclass et al., Development of Automotive LIDAR, Electronics and Communications in Japan, vol. 98, No. 5, 2015; 6 pages.
International Search Report and Written Opinion in corresponding PCT Application No. PCT/US2017/033271, International Filing Date May 18, 2017; dated Sep. 1, 2017.
Su et al, 2-D FFT and Time-Frequency Analysis Techniques for Multi-Target Recognition of FMCW Radar Signal, Proceedings of the Asia-Pacific Microwave Conference 2011, p. 1390-1393.
Wojtkiewicz et al, Two-Dimensional Signal Processing in FMCW Radars, Instytut Podstaw Elektroniki Politechnika Warszawska, Warszawa; 6 pages [retreived on Dec. 20, 2018].
Winkler, Volker, Range Doppler Detection for Automotive FMCW Radars, Proceedings of the 4th European Radar Conference, Oct. 2007, Munich Germany; 4 pages.
Li et al., Investigation of Beam Steering Performances in Rotation Risley-Prism Scanner, Optics Express, Jun. 13, 2016, vol. 24, No. 12; 11 pages.
Thorlabs Application Note, Risley Prism Scanner; 33 pages [retrieved on Dec. 20, 2018].
Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.
International Search Report and Written Opinion in corresponding International Application No. PCT/US2017/033265, dated Sep. 1, 2017; 15 pages.

(56) References Cited

OTHER PUBLICATIONS

International Search Report and Written Opinion in corresponding International Application No. PCT/US2018/054992, dated Dec. 11, 2018; 12 pages.
International Search Report and Written Opinion in corresponding International Application No. PCT/US2018/049038, dated Dec. 12, 2018; 13 pages.

* cited by examiner

DIRECT DETECTION LIDAR SYSTEM AND METHOD WITH PULSE AMPLITUDE MODULATION (AM) TRANSMITTER AND QUADRATURE RECEIVER

RELATED APPLICATION

This application claims the benefit of U.S. Provisional Patent Application No. 62/340,758, filed in the United States Patent and Trademark Office on May 24, 2016, the entire contents of which are incorporated herein by reference.

BACKGROUND

1. Technical Field

The present disclosure is related to LiDAR systems and, in particular, to a direct detection LiDAR system and method with a pulse amplitude modulation (AM) transmitter and a quadrature receiver, which can be used in an automotive or other motor vehicle application.

2. Discussion of Related Art

LiDAR is commonly referred to as an acronym for light detection and ranging, in the sense that LiDAR is commonly considered an optical analog to radar. In general, there are two types of LiDAR systems, namely, incoherent LiDAR and coherent LiDAR. Incoherent LiDAR, also commonly referred to as direct detection or direct energy detection LiDAR, primarily uses an amplitude measurement in light returns, while coherent LiDAR is better suited for phase-sensitive measurements or other more sophisticated transmitter waveform modulation techniques. Coherent systems generally use optical heterodyne detection, which, being more sensitive than direct detection, allows them to operate at a much lower power and provide greater measurement accuracy and resolution, but at the expense of more complex transceiver requirements and cost.

SUMMARY

According to a first aspect, a LiDAR system is provided. The LiDAR system includes a signal generator for generating a continuous periodic signal. A pulse modulation circuit applies a pulse modulation signal to the continuous signal to convert the continuous signal into a plurality of pulses of the continuous signal. An amplitude modulation circuit generates an amplitude modulation envelope signal and applies the amplitude modulation envelope signal to the plurality of pulses to generate a plurality of amplitude-modulated pulses of the continuous signal. An optical modulation circuit receives the plurality of amplitude-modulated pulses of the continuous signal and applies the amplitude-modulated pulses of the continuous signal to an optical signal to generate a pulse amplitude-modulated (PAM) optical signal. Optical transmission elements transmit the PAM optical signal into a region. Optical receiving elements receive reflected optical signals from the region. Receive signal processing circuitry receives the reflected optical signals and uses quadrature detection to process the reflected optical signals.

In some exemplary embodiments, the receive signal processing circuitry includes a pair of I/Q mixers, each of the pair of I/Q mixers receiving a pulse modulation envelope signal and providing the pulse modulation envelope signal to respective analog-to-digital converter circuits. In some exemplary embodiments, the receive signal processing circuitry includes phase shifting circuitry for splitting the continuous signal from the signal generator into a pair of split signals and applying a phase shift to one of the pair of split signals to generate a first LO signal and a second phase-shifted LO signal, the first LO signal and the second phase shifted LO signal being applied to respective second inputs of respective ones of the pair of I/Q mixers. In some exemplary embodiments, the phase shift is 90 degrees, such that the first LO signal and the second phase-shifted LO signal are in quadrature.

In some exemplary embodiments, the continuous signal is a substantially sinusoidal signal.

In some exemplary embodiments, the continuous signal is a pulse modulated signal.

In some exemplary embodiments, the LiDAR system is installed and operates in an automobile.

According to another aspect, a LiDAR method is provided. The method includes the steps of: generating a continuous periodic signal; applying a pulse modulation signal to the continuous signal to convert the continuous signal into a plurality of pulses of the continuous signal; generating an amplitude modulation envelope signal and applying the amplitude modulation envelope signal to the plurality of pulses to generate a plurality of amplitude-modulated pulses of the continuous signal; applying the plurality of amplitude-modulated pulses of the continuous signal to an optical signal to generate a pulse amplitude-modulated (PAM) optical signal; transmitting the PAM optical signal into a region; receiving reflected optical signals from the region; and processing the reflected optical signals using quadrature detection.

In some exemplary embodiments, each of a pair of I/Q mixers receives a pulse modulation envelope signal and provides the pulse modulation envelope signal to respective analog-to-digital converter circuits. In some exemplary embodiments, the method further includes splitting the continuous signal from the signal generator into a pair of split signals and applying a phase shift to one of the pair of split signals to generate a first LO signal and a second phase-shifted LO signal, the first LO signal and the second phase shifted LO signal being applied to respective second inputs of respective ones of the pair of I/Q mixers. In some exemplary embodiments, the phase shift is 90 degrees, such that the first LO signal and the second phase-shifted LO signal are in quadrature.

In some exemplary embodiments, the continuous signal is a substantially sinusoidal signal.

In some exemplary embodiments, the continuous signal is a pulse modulated signal.

In some exemplary embodiments, the method is performed in an automobile.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 2 includes a schematic diagram of the waveform of the pulse amplitude-modulated signal 151 illustrated in FIG.

1, which is applied to the laser modulator 134 of FIG. 1 to generate the pulsed amplitude-modulated optical signal transmitted via transmit optics 144, according to exemplary embodiments.

DETAILED DESCRIPTION

Figure 1:
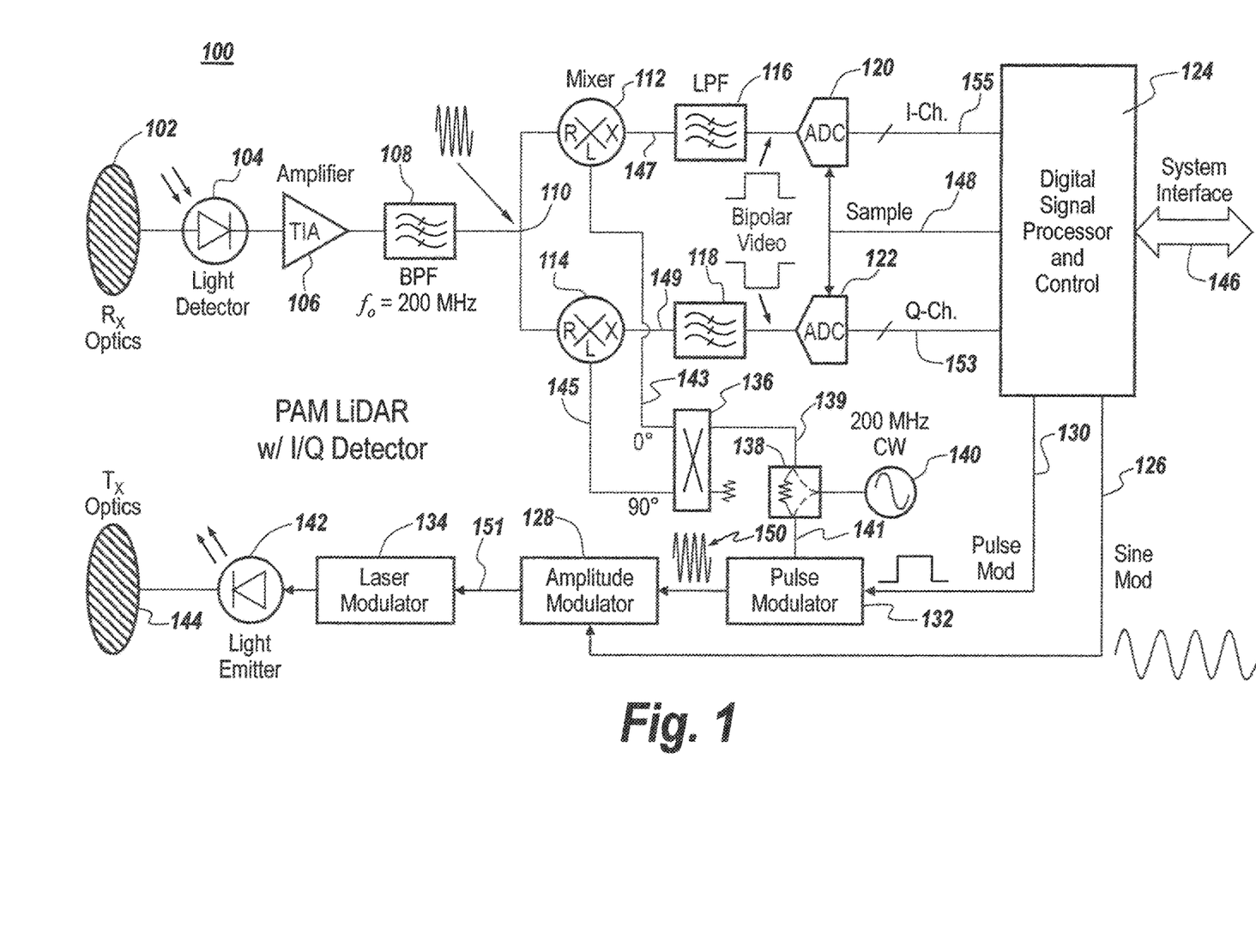
FIG. 1 includes a schematic functional block diagram of a LiDAR system 100 using pulse amplitude modulation and quadrature (I/Q) demodulation, according to exemplary embodiments.

According to exemplary embodiments, a LiDAR system architecture is disclosed in which pulse amplitude modulation (PAM) is employed for determination of range to a target object or objects and velocity of the target object or objects. FIG. 1 includes a schematic functional block diagram of a LiDAR system 100 using pulse amplitude modulation and quadrature (I/Q) demodulation, according to exemplary embodiments. Referring to FIG. 1, system 100 includes receive optics 102 at which optical energy, including optical returns from one or more target objects, are received. The optical energy is received from receive optics 102 at a light detector 104, which converts the received optical energy to one or more electrical signals. The electrical signals are amplified by trans-impedance amplifier (TIA) 106 and filtered by band-pass filter (BPF) 108. In some particular exemplary embodiments, the center frequency of BPF 108, $f_o$=200 MHz, although other frequencies may be utilized. The resulting amplified and filtered signal is applied at node 110 to first inputs of I/Q mixers 112, 114.

The optical signal used to illuminate the one or more target objects is generated by a signal generator 140. The output signal of signal generator 140, which in exemplary embodiments is a continuous substantially sinusoidal signal, is applied to a power splitter 138, which splits the signal and provides the split signal at two outputs. The first output 139 is routed to splitting and phase shifting circuitry or 90-degree power splitter 136, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 136 generates a first "in-phase" local oscillator (LO) signal 143 and a second "quadrature-phase" or "quadrature" LO signal 145, which is shifted in phase by 90 degrees with respect to in-phase LO signal 143. The in-phase and quadrature-phase LO signals 143, 145 are applied to second inputs of I/Q mixers 112, 114, respectively. I/Q mixers 112, 114 mix the amplified and filtered input signal at node 110 with the in-phase and quadrature-phase LO signals 143, 145, respectively, to generate output signals 147, 149, respectively, which are low-pass filtered by low-pass filter (LPF) 116 and LPF 118, respectively. The resulting filtered analog signals are converted to digital signals by analog-to-digital converters (ADC) 120, 122, respectively, and sampled under the control of sample control signal 148, which is generated by digital signal processor and control (DSPC) 124. The resulting sampled digital I/Q (quadrature) signals 155, 153 are processed by DSPC 124 to determine range and/or velocity of the one or more target objects. Results of this detection processing performed by DSPC 124 can be forwarded as desired, such as, for example, to a user interface, via a system interface 146.

Continuing to refer to FIG. 1, the second output 141 of power splitter 138 is routed to a pulse modulator 132, which converts the continuous substantially sinusoidal signal from power splitter 138 to a pulsed substantially sinusoidal signal 150. The timing of pulses in the pulsed sinusoidal signal 150 is controlled by pulse modulation signal 130 from DSPC 124. That is, pulse modulation signal 130 modulates continuous substantially sinusoidal signal 141 to generate pulsed substantially sinusoidal signal 150. In accordance with exemplary embodiments, the amplitude of the pulsed signal 150 can be modulated in an amplitude modulator 128. In particular exemplary embodiments, a substantially sinusoidal modulation signal 126 can be generated by DSPC 124 and forwarded to amplitude modulator 128 to apply a substantially sinusoidal envelope for amplitude modulation of pulsed signal 150. The resulting pulsed amplitude-modulated signal 151 from amplified modulator 128 is applied as a modulation signal to a laser modulator 134, which generates a control/modulation signal, which is applied to light emitter 142 to generate a pulsed amplitude-modulated optical signal, which is transmitted to transmit optics 144, by which the pulsed modulated optical signal is transmitted to the one or more target objects.

Thus, according to exemplary embodiments, the quadrature detection precedes analog-to-digital conversion. The quadrature detector recovers the pulse modulation envelope associated with the low-frequency pulse modulation. The data samples are subsequently processed via spectral resolution of each range bin data set. The spectral resolution approach used reduces the detection bandwidth and effectively integrates the energy of the range bin sample set.

Figure 2:
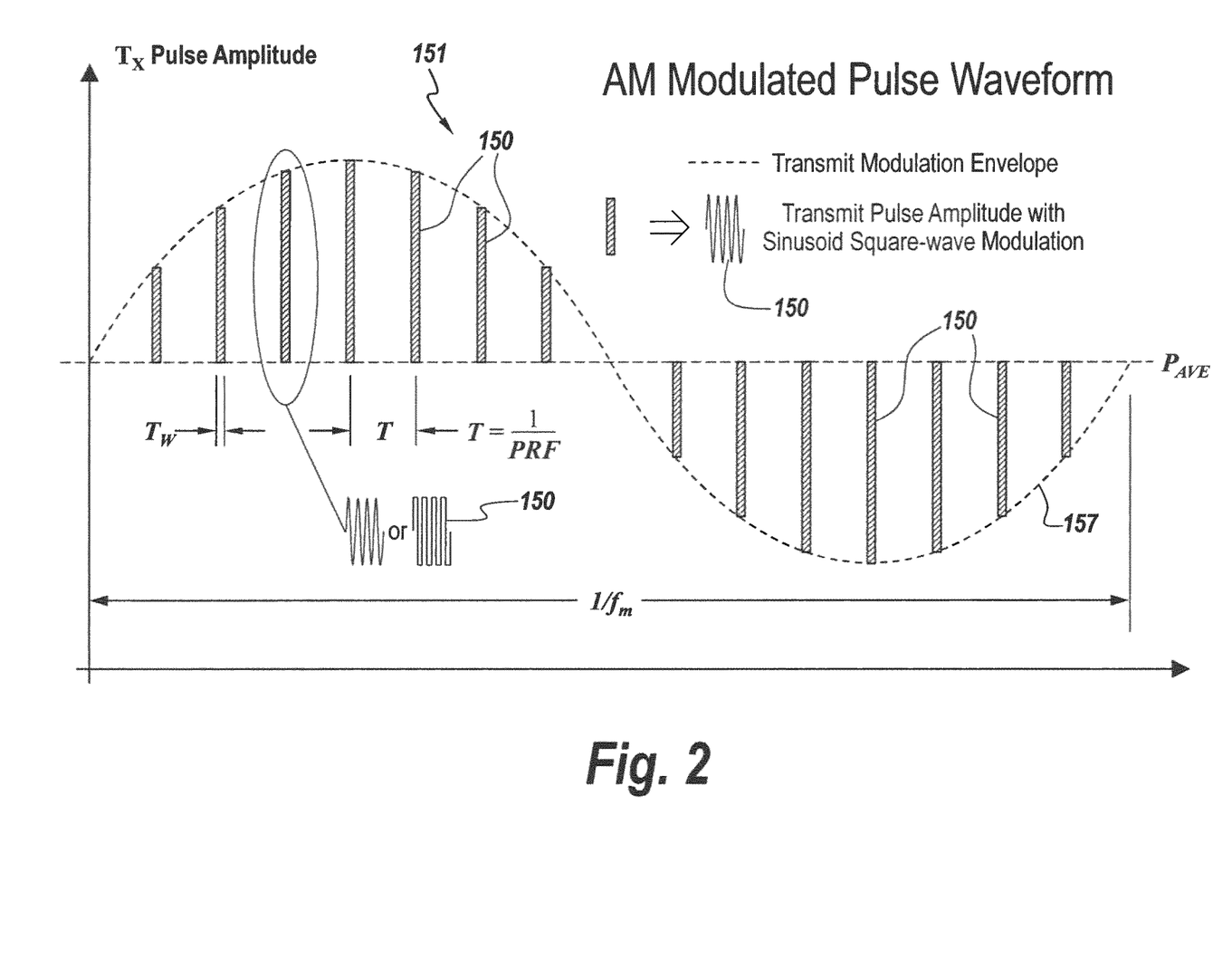

FIG. 2 includes a schematic diagram of the waveform of the pulse amplitude-modulated signal 151 illustrated in FIG. 1, which is applied to the laser modulator 134 of FIG. 1 to generate the pulsed amplitude-modulated optical signal transmitted via transmit optics 144, according to exemplary embodiments. Referring to FIGS. 1 and 2, the curve of FIG. 2 illustrates the pulse amplitude modulated waveform 151 in a graph of transmit Tx pulse amplitude versus time, with the average amplitude being PAVE. The pulse amplitude modulated (PAM) signal 151 includes a series of pulse signals 150 with substantially sinusoidal or substantially square-wave modulation, as described above in connection with FIG. 1. PAM signal 151 is amplitude-modulated according to a transmit modulation envelope 157, illustrated by a dashed line in FIG. 2.

Continuing to refer to FIGS. 1 and 2, each transmit pulse 150 has a time duration, or pulse width, of $\tau_w$. The pulse repetition period $T_{PRF}$ is the inverse of the pulse repetition frequency (PRF), i.e., $T_{PRF}=1/PRF$. The modulation envelope period is the inverse of the modulation envelope frequency $f_m$. It is noted that the PRF is greater than the modulation envelope frequency $f_m$, in accordance with the Nyquist criterion.

Figure 3:
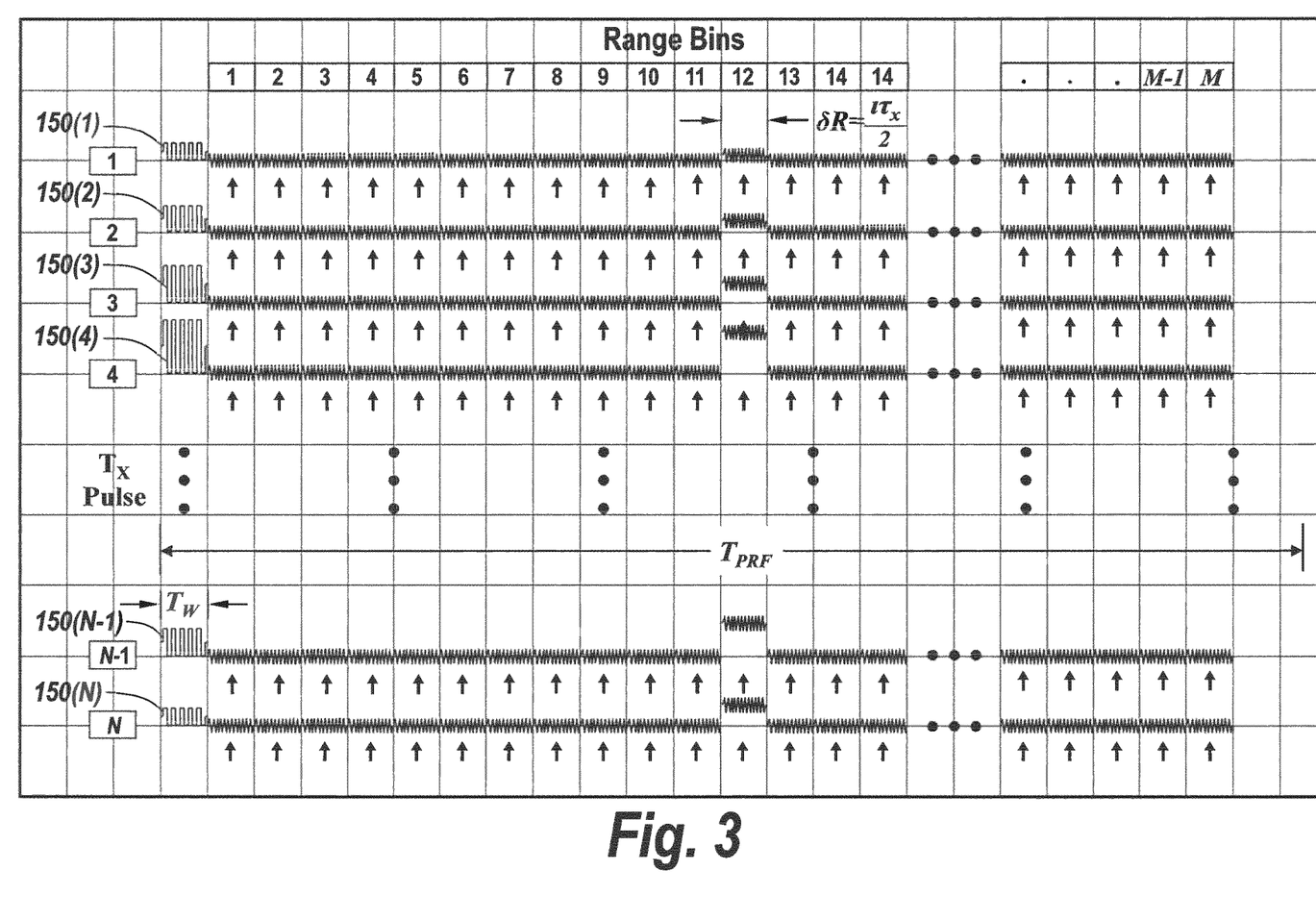
FIG. 3 includes a schematic diagram of the range bin signal returns for a plurality N of amplitude-modulated transmit Tx pulses 150, according to exemplary embodiments.

According to exemplary embodiments, system 100 uses quadrature detection processing of returns from the one or more target objects illuminated by the PAM transmit signal 151 described above in detail. FIG. 3 includes a schematic diagram of the range bin signal returns for a plurality N of amplitude-modulated transmit Tx pulses 150, according to exemplary embodiments. It should be noted that FIG. 3 represents either an I-channel or a Q-channel video signal. Referring to FIGS. 1-3, each of the N transmitted AM pulses

150(1), 150(2), . . . , 150(N−1), 150(N), having pulse width duration $\tau_w$, generates returns, which in some exemplary embodiments are allocated to a plurality M of range bins, numbered 1, 2, . . . , M−1, M, depending on range to the target object. Thus, an N×M matrix of return data is generated as illustrated schematically in FIG. 3. According to the exemplary embodiments, data samples are acquired for each range bin during the inter-pulse period. That is, data sampling for each set of range bins associated with an AM pulse 150 is carried out during the period between the pulse 150(*i*) and the next pulse 150(*i*+1), such that each set of range bins is filled at the pulse repetition frequency (PRF). According to the exemplary embodiments, a fast Fourier transform (FFT) or other spectral resolution method is executed by DSPC 124 for each range bin set, and the signal level at $f_m$ is examined for detection processing. It is noted that a received signal is present in range bin 12 of FIG. 3. As illustrated in FIG. 3, the range resolution δR for each range bin is given by $$\delta R = \frac{c\tau_w}{2}; \quad (1)$$

where $\tau_w$ is the pulse width duration and c is the speed of light. It is noted that equation (1) defines the range cell width, which, in the particular illustrative exemplary embodiments is 3.0 meters.

The sample frequency $f_{sample}$ is given by $$f_{sample} = \frac{1}{\tau_w}. \quad (2)$$

Equation (2) defines the minimum sample rate for range cell data acquisition. In exemplary embodiments, the minimum number of samples is one sample per range bin.

The total acquisition PAM LiDAR data acquisition time $T_{acq}$ is given by $$T_{acq} = N \times T_{PRF} \quad (3).$$

According to exemplary embodiments, at an exemplary closing rate of 250 km/hour or 70 meters/second, the duration $t_{dur}$ of a single range bin occupancy is given by:

$$t_{dur} = \frac{\delta R}{v} = \frac{3.0 \text{ meter}}{70 \frac{\text{meter}}{\text{sec}}} = 42.8 \, msec. \quad (4)$$

Equation (4) defines the time duration for which an object remains within a single range cell. In order to maintain processing gain, the observed object must remain within the sampled range cell for the entire data acquisition time. It is noted that, in these particular illustrative exemplary embodiments, for 1024 range scans at a range scan time of $T_{PRF}$=10 μsec, observation time $T_{acq}$=10.24 msec, which is approximately ¼ of the range cell duration time at 250 km/hr or 70 m/sec.

In this exemplary illustration, the number k of range bins required to accommodate a 210-meter range is given by:

$$k = \frac{R'}{\delta R} = \frac{210 \text{ meter}}{3.0 \text{ meter}} = 70 \text{ range bins.} \quad (5)$$

Assuming a PRF of 100 kHz, the sample number limit $N_{Lim}$, i.e., the maximum limit on the number of samples for an entire observation period is given by:

$$N_{Lim} = \frac{t_{dur}}{T_{PRF}} = t_{dur} \cdot PRF = 4280 \text{ samples.} \quad (6)$$

This is the maximum number of samples for an object remaining within a single range bin at a closing velocity of 250 km/hr (70 m/sec). The data acquisition time for the N×M data matrix is given by:

$$T_{acq} = N \cdot T_{PRF} = 1024 \cdot 10 \cdot 10^{-6} = 10.24 \text{ msec} \quad (7).$$

According to exemplary embodiments, the received signal modulation envelope is subject to delay and phase shift with respect to the modulation signal. According to exemplary embodiments, there are two modulating signals. The first modulating signal is the low-frequency AM of the pulses at a frequency of $f_0$, which, for illustration purposes only, can be assumed to be approximately 10 kHz. The second modulating signal is the high-frequency AM within each pulse, at a frequency of $f_0$, which, for illustration purposes only, can be assumed to be approximately 200 MHz. The low-frequency AM pulse modulates the high-frequency signal, while the AM-modulated high-frequency signal modulates the emitted light signal wavelength (frequency). An FFT or other spectral resolution technique can be used in determination of target object detection. For example, the Goertzel algorithm can be executed for the AM modulation at $f_m$. The Goertzel algorithm is a digital signal processing (DSP) technique that provides a means for efficient evaluation of individual spectral components, such as the AM modulation frequency fm. The FFT or Goertzel algorithm performed on the vertical range bin samples reveals the 10 kHz AM pulse modulation and also the Doppler frequency related to the 200 MHz modulation signal.

According to the exemplary embodiments, it is therefore desirable to use a signal processing technique which provides significant processing gain given the parameter restrictions.

A special case according to some exemplary embodiments uses fixed-amplitude transit pulses. In this case, the bipolar I-channel and Q-channel signals are amplitude modulated at a rate determined by the Doppler frequency. Spectral resolution of the range column data will disclose an object at a specific range and the object velocity as determine by the Doppler frequency, $f_d=2 \, vf_0/c$. It is noted that relative velocity direction, i.e., whether range is increasing or decreasing, may be determined by the phase relationship of the I-channel and Q-channel.

Continuing to refer to FIGS. 1-3, operationally, in some exemplary embodiments, the LiDAR antenna 144 transmits a variable-amplitude pulse signal toward a target object at range R. The amplitude of each pulse is determined by the modulation envelope signal at frequency fm. Within the modulation envelope signal is another higher-frequency signal, which amplitude-modulates the laser transmitter.

Upon incidence with an object within the beam width of the transmit antenna, the transmitted signal is reflected, or scattered, in accordance with the geometric and other physical properties of the object. A fraction of the scattered signal is received by LiDAR light detector 104, where the modulated envelope is recovered and subsequently amplified by the transimpedance amplifier (TIA) 106.

The recovered/amplified transmission waveform envelope is further processed with band-pass filter 108 centered at $f_0$ and bandwidth commensurate with the pulse width ($1/\tau_w$). Band-pass filter 108 rejects extraneous signals as well as broadband noise from TIA 106 and 1/f noise of detector 104 and TIA 106.

Following each variable-amplitude transmit pulse, a receive interval is utilized to provide in-phase and quadrature-phase samples from each range cell of the receive interval. The combination of transmit pulse and receive interval is referred to as a "range scan." The range scan time is typically the inverse of the pulse repetition frequency: T=1/PRF.

During the receive interval of each range scan, the DSPC 124 commands a sample of each channel of the quadrature demodulator, which includes mixers 112, 144 and splitting and phase shifting circuitry or 90-degree power splitter 136. The sample rate is determined by the transmission pulse width, $\tau_w$, in accordance with the equation: $f_s=1/\tau_w$; thereby assuring a receive sample in each resolution range cell. A resolution range cell is determined in accordance with the equation: $\delta R=c\cdot\tau_w/2$.

The data matrix is populated upon successive range scans and samples of the I-channel and Q-channel bipolar video output. The bipolar video output of the quadrature demodulator is a product of the coherent receiver structure where the phase shift of the return signal becomes a variable due to the change in range of moving objects. For fixed-range objects, the demodulated signal varies exclusively as a result of the low-frequency modulating signal at frequency, $f_m$. It should be noted that a data matrix is obtained for I-channel and Q-channels signals.

Upon population of I-channel and Q-channel data matrices, referred to as "filling the matrices," the signal processing techniques are executed. Each column of the data matrices represents a specific range bin, the width of each range bin, also referred to as the range resolution. In the present illustrative exemplary embodiment, the range resolution is 3.0 meters using a 20-nanosecond pulse width.

It should be noted that in the absence of the low-frequency modulating signal, a fixed-amplitude pulse is transmitted and received. The fixed-amplitude pulse transmission may be an additional operational mode for the detection of the Doppler frequency from objects with relative velocity with respect to the LiDAR. The Doppler frequency is directly proportional to the relative velocity and inversely proportional to the wavelength pulse burst in accordance with the equation: $f_d=2\cdot v/\lambda$, where the wavelength $\lambda$ is given by the equation: $\lambda=c/f_o$. This is an important consideration in the object classification process.

In normal operation, where the pulse amplitude is modulated at frequency $f_m$, the spectral resolution of the range bin samples, i.e., the column data of the data matrices, may consider a single frequency, $f_m$. The Goertzel technique is well suited for target detection in this case. The Goertzel technique is a digital signal processing (DSP) technique that provides a means for efficient evaluation of individual terms of the discrete Fourier transform (DFT). The Goertzel technique analyses one selectable frequency component from a discrete signal.

In the case of fixed-amplitude pulses, the columns are filled with fixed-amplitude pulses from stationary objects, and varying-amplitude pulses from objects with relative velocity with respect to LiDAR system 100. Because the Doppler frequency resolution is inversely proportional to the observation time and directly proportional to the pulse burst modulation frequency, precision velocity measurement will benefit from a longer observation interval, i.e., increasing the column data, and increasing the pulse burst modulation frequency, $f_o$.

Assuming that the I-channel and Q-channel data matrices have been populated in accordance with the above detailed description, and that spectral resolution has been executed on each column, a threshold test is typically applied to determine if a signal is present in any of the range bins. For the purpose of illustration, specific reference is made to FIG. 3, which includes a range scan graphic for I-channel or Q-channel, in which the arrows represent ADC sample points from which the data matrix is populated. Referring to FIG. 3, a signal is noted in range bin 12, which corresponds to an object range of $R=12\cdot\delta R=36$ meters, in this particular illustrative exemplary embodiment. This illustrative example illustrates the case where a single object is present. In an automotive application, under modest traffic conditions, multiple objects are anticipated, and the threshold test is be applied to each of the processed range data sets.

Operational factors in connection with the exemplary embodiments described herein in detail include the change in transmission phase shift of the envelope modulation waveform over the two-way range to the object, and coherent detection of the envelope modulation waveform within the quadrature demodulator. Also, the local oscillator for the quadrature demodulator is also the source of the envelope modulation signal.

In the embodiment in which the low-frequency AM modulation is removed, i.e., transmission with fixed pulse amplitude, Doppler frequency is detected based upon the change in two-way transmission phase to the object and phase detection within the quadrature demodulator. The Doppler frequency may be determined upon spectral resolution of the I-channel and Q-channel data sets via execution of the complex fast Fourier transform (FFT) technique.

A principle of transmitter envelope modulation is that upon transmission, the modulation envelope is subject to phase delay in accordance with the envelope modulation frequency, $f_o$. Upon envelope recovery in the photo detector diode 104, the amplitude and transmission phase of the modulation envelope are detected within the quadrature demodulator.

The total transmission phase shift in the two-way range from LiDAR system 100 to object is described by the following equation (8).

$$\Delta\phi = 2\pi \frac{2R}{\lambda_{mod}} \qquad (8)$$

$\Delta\phi$ transmission phase shift $R$ range to object $\lambda_{mod}$ envelop modulation wavelength The mathematical development of Doppler frequency is according to the following.

$$R=2(R_o+v\cdot t)$$

$R_o$ fixed range to object $v\cdot t$ is the change in range, i.e. the velocity time product upon substitution:

$$\Delta\phi = 2\pi \frac{2R_o}{\lambda_{mod}} + 2\pi \frac{2v\cdot t}{\lambda_{mod}} \qquad (9)$$

Doppler frequency is defined: $f_{Doppler} = \frac{1}{2\pi} \frac{d\Delta\phi}{dt}$ executing the differential $f_{Doppler} = \frac{2 \cdot v}{\lambda_{mod}}$ In the operational environment of a system according to exemplary embodiments, continuous-wave (CW) interference causes DC offset at the detector. This is typically caused by sunlight or possibly CW lasers in the local environment. According to some embodiments, this interference can be mitigated via AC coupling in a video preamp. Another technique is Fast Time Constant (FTC), commonly used in marine radar to reduce sea clutter. The FTC technique utilizes analysis of the statistical density of the interference signal. Pulsed interference may be mitigated using PRF jitter, unless the pulsed interference is at the same range bin. An alternate technique involves changes to inter-pulse frequency or PAM frequency or otherwise coding of the PAM frequency. It is also noted that the FFT concentrates the signal energy in a single bin of the FFT. The Goertzel algorithm may be an efficient alternative to the FFT for evaluating energy content at or in proximity of $f_m$.

Figure 4:
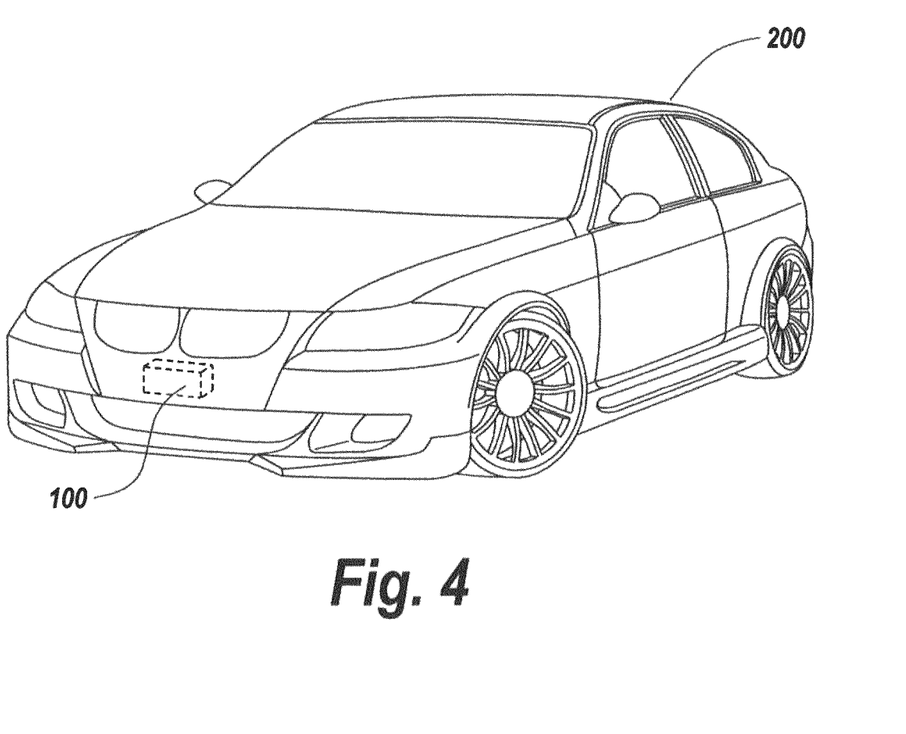
FIG. 4 includes a schematic perspective view of an automobile equipped with one or more LiDAR systems described herein in detail, according to exemplary embodiments.

FIG. 4 includes a schematic perspective view of an automobile 200, equipped with one or more LiDAR systems 100, described herein in detail, according to exemplary embodiments. Referring to FIG. 4, it should be noted that, although only a single LiDAR system 100 is illustrated, it will be understood that multiple LiDAR systems 100 according to the exemplary embodiments can be used in automobile 200. Also, for simplicity of illustration, LiDAR system 100 is illustrated as being mounted on or in the front section of automobile 200. It will also be understood that one or more LiDAR systems 100 can be mounted at various locations on automobile 200.

Figure 5:
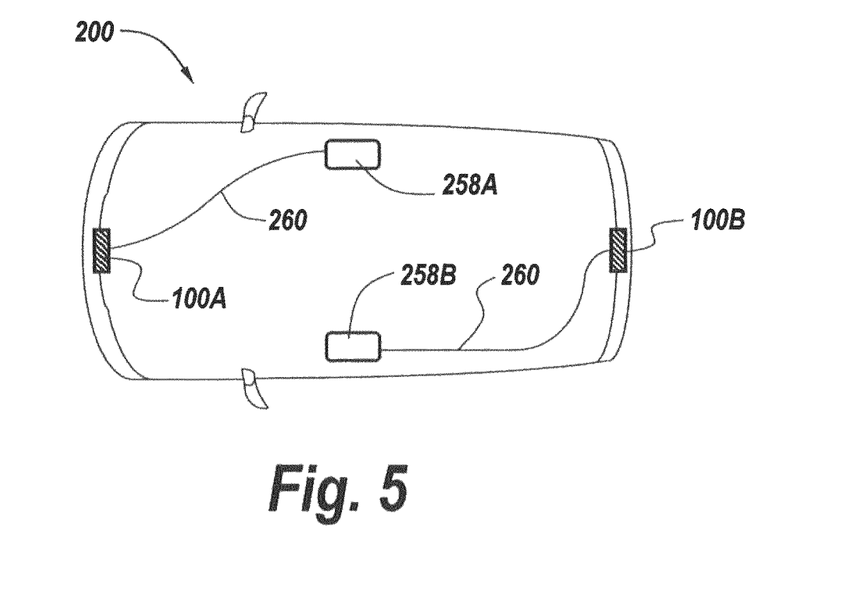
FIG. 5 includes a schematic top view of automobile equipped with two LiDAR systems as described above in detail, according to exemplary embodiments.

FIG. 5 includes a schematic top view of automobile 200 equipped with two LiDAR systems 100, as described above in detail, according to exemplary embodiments. In the particular embodiments illustrated in FIG. 5, a first LiDAR system 100A is connected via a bus 260, which in some embodiments can be a standard automotive controller area network (CAN) bus, to a first CAN bus electronic control unit (ECU) 258A. Detections generated by the LiDAR processing described herein in detail in LiDAR system 100A can be reported to ECU 258A, which processes the detections and can provide detection alerts via CAN bus 260. Similarly, in some exemplary embodiments, a second LiDAR system 100B is connected via CAN bus 260 to a second CAN bus electronic control unit (ECU) 258B. Detections generated by the LiDAR processing described herein in detail in LiDAR system 100B can be reported to ECU 258B, which processes the detections and can provide detection alerts via CAN bus 260. It should be noted that this configuration is exemplary only, and that many other automobile LiDAR configurations within automobile 200 can be implemented. For example, a single ECU can be used instead of multiple ECUs. Also, the separate ECUs can be omitted altogether.

Direct detection LiDAR systems are characterized by construction and functional simplicity and, unlike the more complex homodyne or heterodyne LiDAR systems, do not utilize frequency translation or down-conversion stages which facilitate signal detection and processing gain advantages. Transmitter AM modulation at a specific modulation frequency $f_m$, as described herein in detail in connection with the exemplary embodiments, permits fast execution of the spectral resolution approach, e.g., Goertzel, which reduces the data processing cycle and enhances reaction time to certain emergency operational scenarios. The PAM LiDAR architecture described herein in detail enables processing gain not available to existing direct detection LiDAR systems. The processing gain is the direct result of AM pulse modulation of a coherent signal, which subsequently imparts those modulation components to the laser envelope. The processing gain manifests directly to increase the signal-to-noise ratio (SNR) at the LiDAR detection stage and enables systems with lower transmit power, longer and more accurate measurement range, reduced power consumption and better performance in multiple-system deployment conditions.

According to the exemplary embodiments described herein in detail, transmitter envelope modulation and receiver quadrature demodulation techniques are applied to direct detection LiDAR systems. The technique of transmit envelope modulation in conjunction with receive quadrature demodulation as applied to direct detection LiDAR systems has been demonstrated to provide signal processing gain as determined by the increase in the signal-to-noise ratio at the system detection stage. Significant operational factors include the change in transmission phase shift of the envelope modulation waveform over the two-way range to the object, and coherent detection of the envelop modulation waveform within the quadrature demodulator. In addition, in exemplary embodiments, the envelope modulation waveform is derived from the quadrature demodulation local oscillator, thereby establishing the coherent signal used for detection.

The achievement of signal processing gain in direct detection LiDAR systems far exceeds the modest increase in hardware complexity. The availability of integrated circuit phase-locked loop and quadrature demodulation functions assures ease of implementation with minimum impact to system volume, operating power and cost. Also, the described LiDAR architecture facilitates systems with lower transmit power, longer measurement range, reduced power consumption and better performance in multiple-system deployment conditions.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:
1. A direct detection LiDAR system, comprising:
   a signal generator for generating a continuous periodic signal;
   a pulse modulation circuit for applying a pulse modulation signal to the continuous periodic signal to convert the continuous periodic signal into a plurality of pulses of the continuous periodic signal;

an amplitude modulation circuit for generating a sinusoidal amplitude modulation envelope signal and applying the sinusoidal amplitude modulation envelope signal to the plurality of pulses to generate a plurality of amplitude-modulated pulses of the continuous periodic signal;

an optical modulation circuit for receiving the plurality of amplitude-modulated pulses of the continuous periodic signal and applying the amplitude-modulated pulses of the continuous periodic signal to an optical signal to generate a pulse amplitude-modulated (PAM) optical signal;

optical transmission elements for transmitting the PAM optical signal into a region;

optical receiving elements for receiving reflected optical signals from the region; and receive signal processing circuitry for receiving the reflected optical signals and using quadrature detection to process the reflected optical signals, the receive signal processing circuitry comprising light detection elements which demodulate the reflected optical signals to recover a portion of a reflected version of the continuous periodic signal from a reflected version of the pulse amplitude modulated optical signal.

2. The direct detection LiDAR system of claim 1, wherein the receive signal processing circuitry includes a pair of I/Q mixers, each of the pair of I/Q mixers comprising a first input, the first inputs of the pair of I/Q mixers being coupled to the light detection elements to receive the portion of the reflected version of the continuous periodic signal, each of the I/Q mixers comprising an output, the outputs of the I/Q mixers being coupled to respective analog-to-digital converter circuits to provide a pulse modulation envelope signal to the respective analog-to-digital converter circuits.

3. The direct detection LiDAR system of claim 2, wherein the receive signal processing circuitry includes phase shifting circuitry for splitting the continuous periodic signal from the signal generator into a pair of split signals and applying a phase shift to one of the pair of split signals to generate a first local oscillator (LO) signal and a second phase-shifted LO signal, the first LO signal and the second phase shifted LO signal being applied to respective second inputs of respective ones of the pair of I/Q mixers.

4. The direct detection LiDAR system of claim 3, wherein the phase shift is 90 degrees, such that the first LO signal and the second phase-shifted LO signal are in quadrature.

5. The direct detection LiDAR system of claim 1, wherein the continuous periodic signal is a sinusoidal signal.

6. The direct detection LiDAR system of claim 1, wherein the continuous periodic signal is a square wave signal.

7. The direct detection LiDAR system of claim 1, wherein the LiDAR system is installed and operates in an automobile.

8. A direct detection LiDAR method, comprising:
generating a continuous periodic signal;
applying a pulse modulation signal to the continuous periodic signal to convert the continuous periodic signal into a plurality of pulses of the continuous periodic signal;
generating a sinusoidal amplitude modulation envelope signal and applying the sinusoidal amplitude modulation envelope signal to the plurality of pulses to generate a plurality of amplitude-modulated pulses of the continuous periodic signal;
applying the plurality of amplitude-modulated pulses of the continuous periodic signal to an optical signal to generate a pulse amplitude-modulated (PAM) optical signal;
transmitting the PAM optical signal into a region;
receiving reflected optical signals from the region; and
processing the reflected optical signals using quadrature detection, the processing comprising demodulating the reflected optical signals to recover a portion of a reflected version of the continuous periodic signal from a reflected version of the pulse amplitude modulated optical signal.

9. The direct detection LiDAR method of claim 8, wherein each of a pair of I/Q mixers comprises a first input for receiving the portion of the reflected version of the continuous periodic signal, each of the I/Q mixers comprising an output, the outputs of the I/Q mixers being couple to respective analog-to-digital converter circuits to provide pulse modulation envelope signal to the respective analog-to-digital converter circuits.

10. The direct detection LiDAR method of claim 9, further comprising splitting the continuous periodic signal from the signal generator into a pair of split signals and applying a phase shift to one of the pair of split signals to generate a first local oscillator (LO) signal and a second phase-shifted LO signal, the first LO signal and the second phase shifted LO signal being applied to respective second inputs of respective ones of the pair of I/Q mixers.

11. The direct detection LiDAR method of claim 10, wherein the phase shift is 90 degrees, such that the first LO signal and the second phase-shifted LO signal are in quadrature.

12. The direct detection LiDAR method of claim 8, wherein the continuous periodic signal is a sinusoidal signal.

13. The direct detection LiDAR method of claim 8, wherein the continuous periodic signal is a square wave signal.

14. The direct detection LiDAR method of claim 8, wherein the method is performed in an automobile.

* * * * *